Patented Aug. 2, 1932

1,869,481

UNITED STATES PATENT OFFICE

LEOPOLD KAHL, OF BERLIN-WILMERSDORF, GERMANY

PROCESS FOR PRODUCING PURE ANTHRACENE

No Drawing. Application filed June 27, 1929, Serial No. 374,289, and in Germany September 29, 1928.

It is known to prepare from crude anthracene of about 50–70° anthracene content, an anthracene containing over 90% of this material as well as potassium carbazole by dissolving the crude anthracene in neutral, indifferent solvents, and converting the carbazole into potassium carbazole by heating with caustic potash, which potassium carbazole separates from the solution. In this process quantities of potash must be used which represent a three- to five-fold excess over those which are theoretically necessary for the formation of potassium carbazole.

It has now been found that by using basic solvents, in fact primary, secondary or tertiary organic bases, with the theoretical quantity of potash, an anthracene of 99% purity and over, free from carbazole, is obtained from a crude anthracene of about 40% purity, provided the process is carried out as follows:

1 part of crude anthracene containing about 40% anthracene and about 20% carbazole is, for example, heated while being stirred, with double the quantity of bases (pyridine, or the mixture of pyridine bases obtained from coal tar) and with quantities of caustic potash which correspond to the ratio of 1 mol of carbazole to 1 mol of caustic potash. The liquid is maintained for about two hours at a temperature of for example 160–170° C. and is then allowed to cool. If the reaction mixture so obtained, cooled down to about 20°, is filtered, an anthracene remains behind in the filter which, after removal of the liquid adhering to it, is almost chemically pure. The process may also be carried out in the same manner using a solvent consisting half of pyridine or a mixture of pyridine bases from coal tar and half of solvent naphtha.

In accordance with my invention according to the example given above aliphatic or aromatic bases may be used for the bases, such as, for example, pyridine, quinoline or the mixture of organic bases obtainable from coal tar. Also the first-named bases may be used alone or admixed with each other. A part of the bases may be replaced by other solvents, such as, for example, benzene, benzine, hydrogenated hydrocarbons (e. g. tetrahydronaphthalene) and so on, in which the anthracene is difficultly soluble at ordinary temperature, but in which the accompanying substances and the potash compounds formed, on the other hand, are readily soluble. The quantity of solvent used is advantageously so regulated that the pure anthracene separates out on cooling the solution, whilst the impurities contained in the crude anthracene and the potash compounds formed from them remain in solution. For example, from once to twice the quantity of solvent calculated on crude anthracene is used. In order to remove carbazole from the anthracene it is sufficient to use the equimolecular quantity of caustic potash; naturally, however, greater amounts of caustic potash may also be allowed to act on the crude anthracene. The heating depends on the boiling point of the solvent used. The maintenance of a temperature of 150 to 180° has proved to be advantageous for carrying out the process.

During the process the whole of the alkali is taken up by the bases serving as solvent, held in solution and passed through the filter, so that only the pure anthracene remains behind in undissolved form. The form in which the carbazole is held in solution in the bases could not be established. It cannot be in the form of potassium carbazole, since this latter is insoluble in bases.

The process may also be carried out such that the 40% crude anthracene is preliminarily purified according to any one known process, and the higher percentage anthracene so-obtained subjected to the described treatment.

By the term "organic bases" is to be understood in this specification generally primary, secondary or tertiary aliphatic or aromatic organic compounds of basic character or mixtures of these. The bases or mixtures thereof may also be used in mixtures with solvents in which the anthracene is difficultly soluble at ordinary temperatures but in which the accompanying substances and the potash compounds formed are easily soluble.

The present invention is not limited to the above described forms of procedure, but it relates generally to the purification of anthracene by dissolution in liquids containing organic bases and separation of the anthracene from the carbazole by treatment with caustic potash and subsequent filtration of the liquid, whereby the purified anthracene remains behind undissolved.

What I claim is:

1. A process for the purification of anthracene comprising dissolving the anthracene in liquids comprising essentially organic bases, treating the solution with caustic potash in the hot, and filtering the solution after cooling, as set forth.

2. A process for the purification of anthracene comprising dissolving the anthracene in liquids comprising essentially organic bases, treating the solution in the hot with equimolecular quantities of caustic potash calculated on the carbazole content of the anthracene and filtering the solution after cooling, as set forth.

3. A process for the purification of anthracene comprising dissolving the anthracene in double the quantity of liquid comprising essentially organic bases, treating the solution with caustic potash in the hot, and filtering the solution after cooling, as set forth.

4. A process for the purification of anthracene comprising dissolving the anthracene in liquids comprising essentially organic bases, treating the solution with caustic potash at about 160–170° C., and filtering the solution after cooling, as set forth.

5. A process for the purification of anthracene comprising dissolving the anthracene in liquids comprising essentially organic bases, treating the solution while being stirred with caustic potash in the hot, and filtering the solution after cooling, as set forth.

6. A process for the purification of anthracene comprising dissolving the anthracene in double the quantity of liquids comprising essentially organic bases, treating the solution with caustic potash, stirring and heating the solution at 160–170° C. for two hours, and allowing the solution to cool down to room temperature and filtering, as set forth.

7. A process for the purification of anthracene comprising dissolving the anthracene in a solvent comprising essentially a mixture of several organic bases, treating the solution with caustic potash in the hot and filtering the solution after cooling, as set forth.

8. A process for the purification of anthracene comprising dissolving the anthracene in a liquid consisting of organic bases and other solvents, the anthracene being difficultly soluble at ordinary temperatures in said liquid, whilst, on the other hand, the accompanying substances and the potash compounds formed being easily soluble in said liquid, treating the solution obtained with caustic potash in the hot, and filtering the solution after cooling, as set forth.

In testimony whereof I affix my signature.

LEOPOLD KAHL.